United States Patent
Stark

[11] Patent Number: 6,052,919
[45] Date of Patent: Apr. 25, 2000

[54] PROCESS FOR MAKING GRANULATE OF POLYMERIC MATERIAL

[75] Inventor: Bernhard Stark, Fronreute, Germany

[73] Assignee: Waeschle GmbH, Weingarten, Germany

[21] Appl. No.: 09/203,931

[22] Filed: Dec. 2, 1998

[30] Foreign Application Priority Data

Dec. 15, 1997 [DE] Germany .......................... 197 55 732

[51] Int. Cl.$^7$ ...................................................... F26B 5/06
[52] U.S. Cl. ................................ 34/304; 34/383; 34/384; 34/388
[58] Field of Search ............................... 34/304, 313, 380, 34/381, 382, 383, 384, 388, 398, 429; 156/94, 230, 281; 241/23, 24.18, 65, 79.1; 162/21, 22

[56] References Cited

U.S. PATENT DOCUMENTS

| | | | |
|---|---|---|---|
| 1,851,509 | 3/1932 | Hampton | 34/304 X |
| 2,020,719 | 11/1935 | Bottoms | 34/304 X |
| 5,187,880 | 2/1993 | Rudolph . | |
| 5,581,907 | 12/1996 | Kuma et al. | 34/388 X |
| 5,787,604 | 8/1998 | Kreuz et al. | 34/384 |
| 5,908,165 | 6/1999 | Guschall et al. | 241/23 |

FOREIGN PATENT DOCUMENTS

| | | |
|---|---|---|
| 26 49 396 A1 | 5/1977 | Germany . |
| 36 31 376 C1 | 5/1988 | Germany . |
| 42 41 568 C2 | 6/1994 | Germany . |

OTHER PUBLICATIONS

G. Götz: Spin Away–Dryer Zentrifugaltrockner zum Entwässern von Kunststoffgranulaten, p. 1180/1182, GAK Dec. 1972.

Dissertation, entitled Hydraulische Förderung von Eis zum Kühlen von Bergwerken, Technical University of Hannover, 1991.

*Primary Examiner*—Stephen Gravini
*Attorney, Agent, or Firm*—Henry M. Feiereisen

[57] ABSTRACT

In a process for making plastic granulate, a polymeric material is plastifyed into a plastic mass which is divided into single plastic strands. After pressing the plastic strands in a stream of cooling liquid, the plastic strands are shredded in the cooling liquid into granules, thereby forming a dispersion which is conveyed through a first conduit to a separator. The dispersion is concentrated in the separator by withdrawing a portion of cooling liquid, and subsequently transported to a dryer along a second conduit which is longer than the length of the first conduit. In the dryer, the cooling liquid is separated from the granulate.

14 Claims, 3 Drawing Sheets

PROCESS FOR MAKING GRANULATE OF POLYMERIC MATERIAL

CROSS-REFERENCES TO RELATED APPLICATIONS

This application claims the priority of German Patent Application Serial No. 197 55 732.5, filed Dec. 15, 1997, the subject matter of which is incorporated herein by reference.

BACKGROUND OF THE INVENTION

The present invention generally relates to a process for making granulate of polymeric material.

The publication, entitled "Spin-Away-Dryer Zentrifugaltrockner zum Entwässern von Kunststoffgranulaten", by G. Götz, GAK 12/1972, page 1180, discloses a typical granulating plant for making granulate of polymeric material by pressing strands, formed from a plastic mass, in a stream of cooling liquid, e.g. water, and shredding the plastic strands in the cooling liquid into granulate, thereby forming a dispersion. This dispersion of granulate and cooling liquid is conveyed to a separator to increase the amount of granulate in the cooling liquid by removal of a portion of cooling liquid. The so-concentrated dispersion of granulate and cooling liquid is subsequently conveyed to a dryer for separation of the cooling liquid from the granulate. The dryer is situated, i.a. for space-saving reasons, in immediate proximity of the granulating device. Positioned immediately upstream of the dryer is a pre-separator which separates just enough water so that the remaining amount of water still ensures a safe transport of the granulate stream from the pre-separator into the dryer while providing relief for the dryer. Thus, the distance between the pre-separator and the dryer is bridged by a respectively short, and moreover descending conduit which has a same diameter as the conduit between the granulating device and the pre-separator. With this conventional process, the transport of the dispersion of granulate and cooling liquid, exiting the granulating device, to a dryer becomes difficult when the dryer is located at a remote location.

According to a brochure released by the company GALA Kunststoff-und Kautschukmaschinen GmbH, a process is known in which powdery or coarse polymeric material is heated by an extruder, plastifyed, and pressed through a perforated plate into a stream of water, thereby forming single strands of the plastic mass. Placed in the stream of water is a blade which rotates to shred the solidified singled plastic strands into granulate. The dispersion of cooling granulate and water is conveyed hydraulically along a relatively short path in a feed conduit to a dryer by which water is separated from the granulate. The separated water is then filtered, tempered and returned under pressure by a pump back into a reservoir, while dried granulate is transported pneumatically to a relatively remote location, for example, to a storage silo.

For technological reasons, this conventional process must be operated with a water amount which is high compared to the amount of granulate, i.a. in order to prevent formation of so-called double grain as a result of bonded granules due to insufficient cooling action. Therefore, the granulate content of the dispersion in the conduit to the dryer ranges only about 5 to 10% by volume. Such a low granulate content does not permit to operate a hydraulic conduit in a cost-efficient manner. For that reason, the dryer is positioned in proximity of the extruder, and the dried granulate is conveyed, in case of need, pneumatically. A pneumatic conveyance is, however, fairly complicated.

From the dissertation, entitled "Hydraulische Förderung von Eis zum Kühlen von Bergwerken", Technical University of Hannover, 1991, relating to a different field of art, a test plant is known for hydraulically conveying a mixture of ice and water. The test plant includes essentially a ring-shaped closed pipeline which is supplied from a vacuum-ice machine with a dispersion of ice and water, with the content of ice being relatively low. By means of a centrifugal pump, the ice content is increased by pumping the dispersion at low flow rate in a circular path, while a volume flow of water is withdrawn from the pipeline via an integrated screen pipe whereby the volume flow of water is equal to the volume flow of the ice/water dispersion fed from the vacuum-ice machine, and is returned to the vacuum-ice machine. When the desired ice content is reached, the pump output is increased until the desired flow velocity for the test is realized. The increase of the ice content of the dispersion is however rather limited because the output of a centrifugal pump progressively deteriorates as the ice content, i.e. solids content, rises.

SUMMARY OF THE INVENTION

It is thus an object of the present invention to provide an improved process for making granulate of polymeric material, obviating the afore-stated drawbacks.

In particular, it is an object of the present invention to provide an improved process for making granulate of polymeric material, which is so configured as to allow an economic transport of a dispersion of granulate and cooling liquid, exiting the granulating device, to a remote, where necessary even far away, dryer.

These objects, and others which will become apparent hereinafter, are attained in accordance with the present invention by pressing single strands formed from a plastic mass in a stream of cooling liquid and shredding the plastic strands in the cooling liquid into granules, thereby forming a dispersion, conveying the dispersion of granules and cooling liquid through a first conduit to a separator for concentrating the dispersion through increase of the content of granulate in the cooling liquid through withdrawal of a portion of cooling liquid, conveying the concentrated dispersion of granules and cooling liquid to a dryer along a second conduit which is longer, preferably by at least one order of a number, than the length of the first conduit, and separating the cooling liquid from the granulate.

The present invention is based on the recognition that the hydraulic conveyance of solids becomes more cost-efficient with increasing solids content of the dispersion, and that the granulate content in the conventional granulating process for the hydraulic transport of the dispersion can be raised far beyond the value to be observed for the actual granulating step, before a clogging of the hydraulic conduit is encountered. In accordance with the present invention, it is thus possible to position the dryer at a distant location from the extruder, e.g. in proximity of a storage silo, so that the costs involved for a pneumatic transport of the granulate from the dryer to the storage silo can be saved.

Further costs can be saved by configuring the nominal diameter of the second conduit at smaller dimension than the nominal diameter of the first conduit. The diametric ratio may, preferably, be less than 0.5.

Preferably, the cooling liquid separated from the granulate in the dryer is returned for re-use as coolant during pressing and shredding operations of the single strands. Also, the withdrawn portion of the cooling liquid can be used again for cooling action.

Depending on local conditions, the conveying pressure generated by the pump for returning the separated cooling liquid may be sufficient for transport of the dispersion. Occasionally, situations may arise which require a pumping of the dispersion itself. This may be realized upstream or downstream of the point of withdrawal of the partial flow of the cooling liquid from the dispersion, through respective placement of a pump. In upstream configuration, the pump runs at a slightly better efficiency and is subject to less wear since the granulate content is lower. This configuration is recommended especially when using pumps which have a volume flow and a lift that depend heavily on the solids content of the medium. This is particularly true for centrifugal pumps. In downstream configuration, the pump can be dimensioned solely to accommodate the reduced volume flow of the now higher concentrated dispersion. This means, however, that the maximum conveying capacity of the feed conduit cannot be fully exploited because the feed conduit can be operated with a significantly higher solids content of the dispersion than the pump. Thus, an optimum solution seeks a combination of both configurations, which, in a first step, concentrates the dispersion to a solids content that is sufficiently compatible for the pump, and, in a second step, increases the solids content to an extent that best utilizes the capacity of the feed conduit.

If desired, the dispersion may be conditioned, for example, heated or cooled, either before transport of the dispersion to the dryer or/and before entry of the dispersion into the dryer.

According to another feature of the present invention, the hydraulic conveyance, in particular the transport along a longer path, may be enhanced and optimized by a closed loop control, whereby in particular the withdrawn partial flow of the coolant is utilized as manipulated variable in dependence on a controlled variable which may be commensurate with the granulate content, volume flow, or pressure of the dispersion.

According to still another feature of the present invention, the transport path of the dispersion between the location of withdrawal of the portion of cooling liquid and the dryer is longer by an order of a number than the transport path of the dispersion between the location of shredding the single plastic strands and the location of withdrawal of the portion of cooling liquid.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
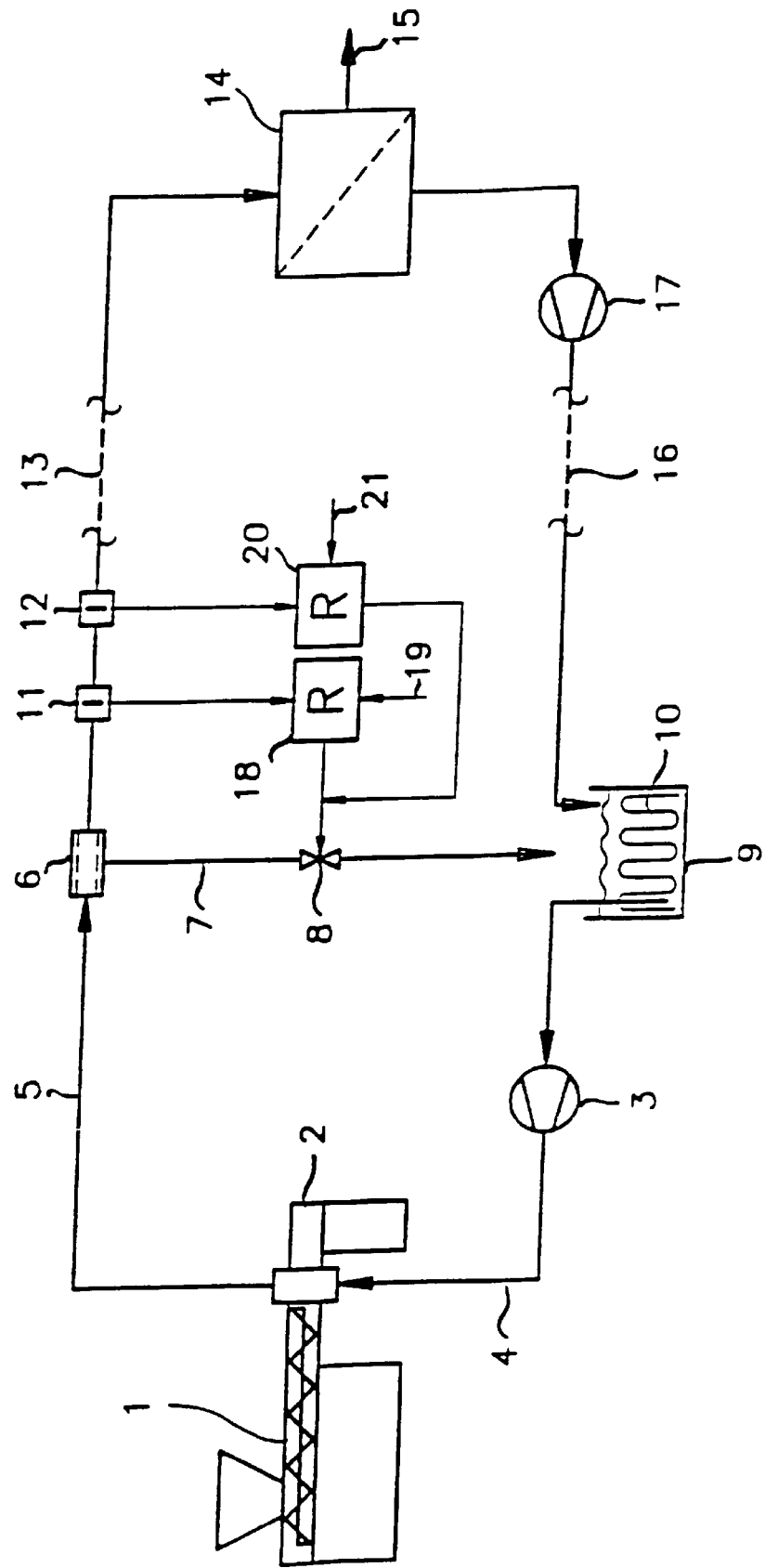
FIG. 1 is a schematic illustration of a first embodiment of a granulating plant according to the present invention with integrated hydraulic conveyance.

Throughout all the Figures, same or corresponding elements are generally indicated by same reference numerals.

Turning now to the drawing, and in particular to FIG. 1, there is shown a first embodiment of a granulating plant according to the present invention, including an extruder 1 which has a die plate (not shown) e.g. in the form of a perforated plate (not shown) for forming from the extruded plastic mass single strands. A granulator 2 receives the single strands and includes a blade (not shown) for cutting or shredding the strands within a water bath into granules, with the water bath being filled with cooling liquid by a pump 3 via a conduit 4. It will be appreciated by persons skilled in the art that the structure of the granulator 2 is generally known to the skilled artisan so that a detailed discussion thereof has been omitted for sake of simplicity.

The dispersion obtained from the granulator 2 and containing granules and water is conveyed along a conduit 5 to a screen pipe 6 for separating and withdrawing a portion of water, thereby concentrating the dispersion by increasing the granulate content in water. The screen pipe 6 may be substituted by any device that operates in a comparable manner to withdraw a portion of water from the dispersion. The withdrawn partial flow of granulate-free water is fed at any suitable location back into the cooling liquid circulation via a conduit 7 whereby the flow through the conduit 7 is controlled by a valve 8. In the nonlimiting example of FIG. 1, the partial flow of granulate-free water is fed to a reservoir 9 which is disposed in the cooling liquid circulation and has incorporated therein a device 10 for tempering the cooling liquid. The pump 3 draws from the reservoir 9 the cooling liquid for introduction into the granulator 2 via the conduit 4. Following the screen pipe 6, the thus concentrated dispersion is directed via a feed conduit 13 to a dryer 14 to be described hereinafter.

The position of the controllable valve 8 is determinative for the volume flow, i.e. the flow rate of the withdrawn partial flow of granulate-free water through the conduit 7. A suitable, fixed setting of the valve 8 already results in a concentration that significantly increases the conveying capacity of the feed conduit 13 as far as transported granulate volume per time unit is concerned. Thus, regardless of the volume of granulate produced per time unit and predetermined by the output of the granulator 2, the feed conduit 13 can be dimensioned of smaller nominal diameter than would be possible without such concentration from e.g. 5 to 10% by volume to e.g. 30 to 40% by volume.

The conveying capacity of the feed conduit 13 can be exploited even better when integrating a closed loop control, including a measuring unit 11 and, optionally, a further measuring unit 12, which are still to be described and positioned in flow direction downstream of the screen pipe 6. The actual hydraulic conveyance of the concentrated dispersion is subsequently realized in the feed conduit 13 for transport to the dryer 14 which is positioned in immediate proximity of the location where the granulate is ultimately used. The length of the feed conduit 13 is preferably a multiple of the length of conduit 5. In particular, the feed conduit 13 is longer by at least one order of a number than the conduit 5. For example, when the length of the conduit 5 is 25 to 50 m at an inside diameter of, e.g., about 160 mm and at a flow velocity of 2.5 m/s and 6% by volume of granulate in the dispersion so that a sufficiently long residence time of e.g. 10 to 20 s is available for cooling the granulate, the length of the feed conduit 13 is then dimensioned e.g. between 250 and 1000 m at an inside diameter of, e.g., about 70 mm and at a flow velocity of 2.5 m/s and 35% by volume of granulate in the dispersion.

The granulation water is separated from the granulate in the dryer 14. A specific construction and manner of a suitable dryer is fully described, for example, in U.S. Pat. No. 5,187,880, issued Feb. 23, 1993. The granulate is discharged via an output 15 while the granulate-free water is returned into the reservoir 9 via a return conduit 16 in which, optionally, a further pump 17 is positioned.

The measuring unit 11 is so designed as to selectively measure either the granulate content, the volume flow of the dispersion, or the pressure at the beginning of the feed conduit 13, and to form a corresponding output signal which is transmitted to a controller 18. This controller 18 has an input 19 supplied with a desired value or command variable which is a variable not directly influenced by the control involved here and is fed from outside. The actual value received from the measuring unit 11 is compared by the controller 18 with the desired value or command variable for suitable adjustment of the valve 8 in response to the executed comparison. The controller 18 thus intends to maintain the actual value in substantial correspondence to the desired value or command variable. Persons skilled in the art will understand that the operation of the measuring unit 11, i.e. for which measurement the measuring unit 1 is designed, depends on the needs at hand. If, for example, the maximum conveying capacity of the hydraulic feed conduit 13 should be exploited to a greatest possible extent, the measuring unit 11 is so designed as to measure and control the volume flow of the dispersion or the pressure at the beginning of the feed conduit 13. However, if the processing capacity of the dryer 14 is limited, it may be more suitable to measure and control the granulate content. The command variable of the controller 18 may then be derived from a variable characteristic for the operational state of the dryer 14, for example the temperature at entry into the dryer 14. Although not shown in the drawing, the controller 18 may further generate, where necessary, an additional signal for influencing the flow rate of the pump 3.

The optional measuring unit 12 registers a different variable as the measuring unit 11 and outputs a corresponding signal to an optional controller 20 which receives a desired value or command variable at input 21 for comparison with the actual value as measured by the measuring unit 12. The control signal outputted by the controller 20 is imposed on the control signal outputted by the controller 18. As an alternative, the control signal of the controller 20 may also replace or form the command variable for the controller 18. When, for example, the measuring unit 11 is intended to monitor the granulate content in view of the need to keep the granulate content primarily constant, the measuring unit 12 may measure the pressure or the volume flow at the beginning of the hydraulic feed conduit 13. When a pressure increase or a decrease of the volume flow is detected, thus possibly indicating an imminent clogging of the hydraulic feed conduit 13, the controller 20 generates a respective control signal for closing or at least readjusting the position of the controllable valve 8 in closing direction until the danger of clogging is eliminated as a consequence of a realized decrease of the granulate content and associated improved conveying capability of the dispersion.

Figure 2:
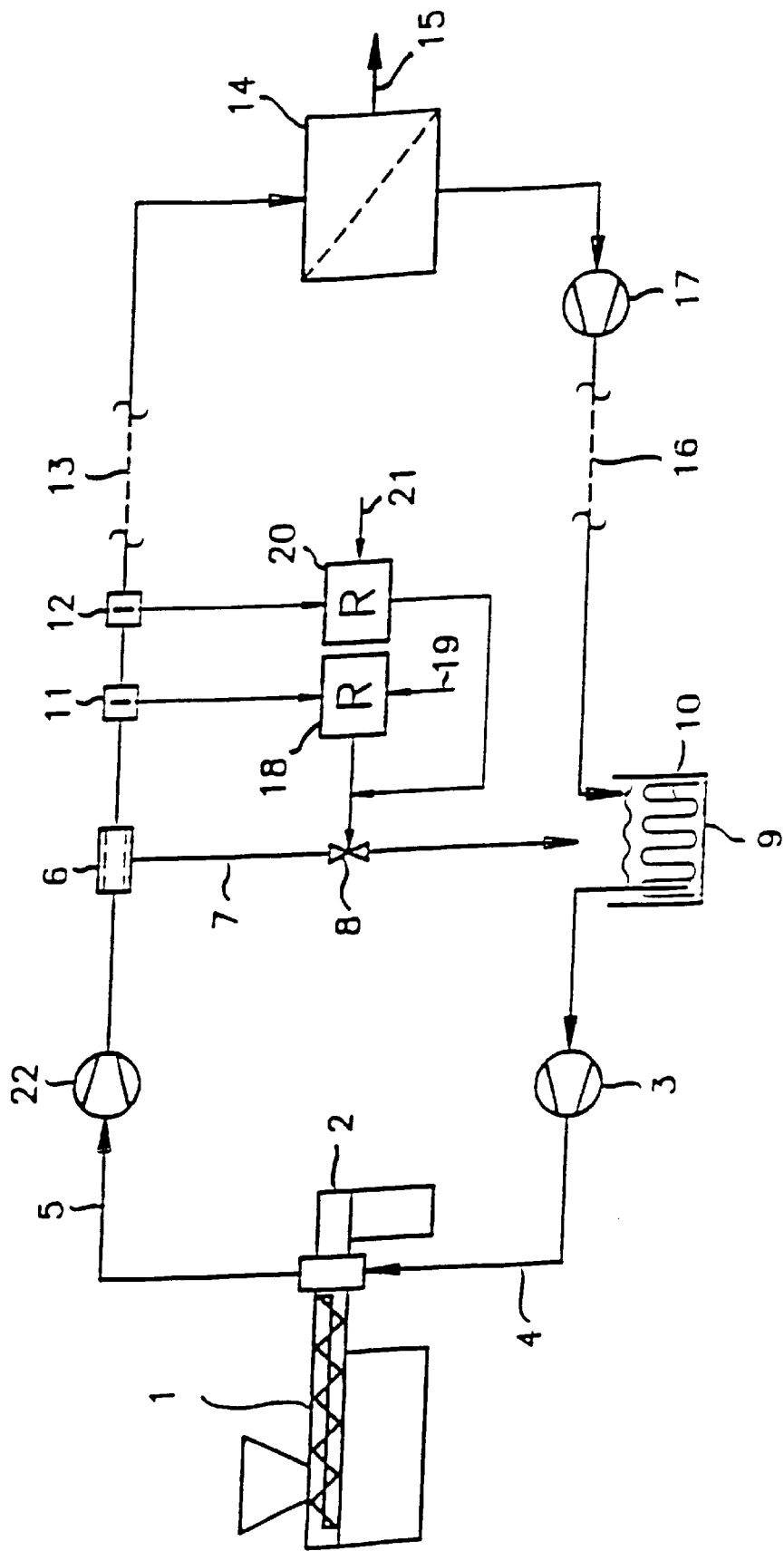
FIG. 2 is a schematic illustration of a second embodiment of a granulating plant according to the present invention with integrated hydraulic conveyance.
Figure 3:
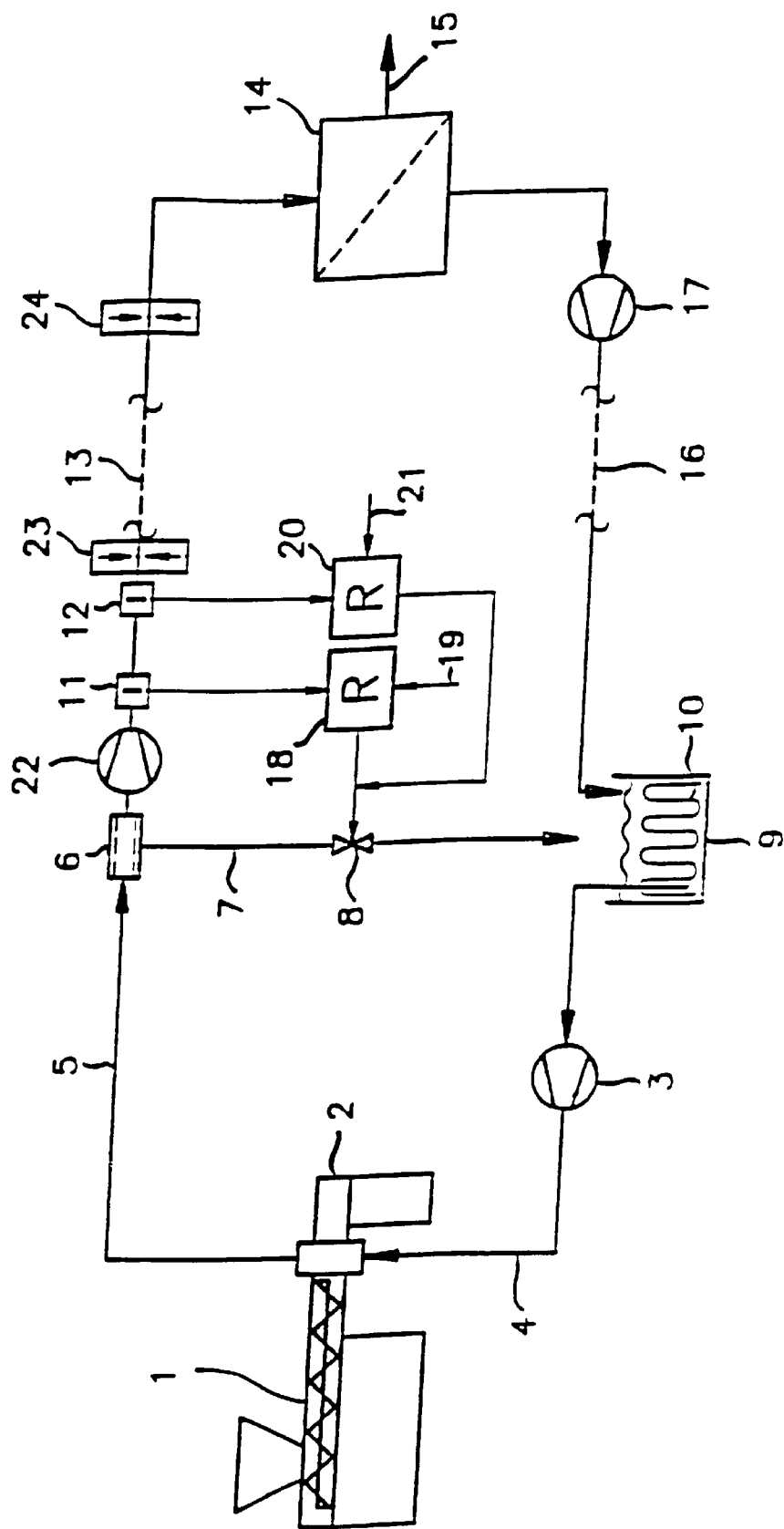
FIG. 3 is a schematic illustration of a third embodiment of a granulating plant according to the present invention with integrated hydraulic conveyance.

Normally, the flow rate of the pump 3 is insufficient to transport the dispersion over a great distance. In this case, an auxiliary pump 22 is required to be incorporated in the path between the granulator 2 and the beginning of the feed conduit 13. Such an auxiliary pump 22 may be positioned upstream of the screen pipe 6, as shown in FIG. 2, or downstream of the screen pipe 6, as shown in FIG. 3. In the configuration of FIG. 2, the auxiliary pump 22 is designed to transport the entire relatively weakly concentrated volume flow of the dispersion exiting the granulator 2; However, the closed loop comprised of the screen pipe 6, measuring unit 11, controller 18 and valve 8 allows a concentration of the dispersion to thereby realize an optimum exploitation of the conveying capacity through the feed conduit 13. In this case, the granulate content of the dispersion may then range at 40 to 50% by volume. The configuration of FIG. 3 makes use of the fact that the pump 22 is able to convey, without any troubles and without significant deterioration of the efficiency, a dispersion with a significantly higher granulate content of e.g. 30% by volume compared to the dispersion that exits the granulator 2 with a granulate content of approximately 5 to 10% by volume. In this case, the pump 22 can be dimensioned to only suit the volume flow of the dispersion, decreased by the withdrawn partial flow of granulate-free water. However, the conveying capacity of the feed conduit 13 is not utilized in an optimum manner. Thus, in situations using very long feed conduits and/or substantial volume flows, it may be suitable for economical reasons to incorporate downstream of the pump 22 a further screen pipe (not shown) which interacts with a closed loop control like the closed loop control comprised of screen pipe 6, measuring unit 11, controller 18, valve 8 and, optionally, measuring unit 12 and controller 20. The dispersion is thus concentrated in an optimum manner in two stages upstream and downstream of the pump 22.

As further shown in FIG. 3, the granulating plant is further provided with a conditioning device 23 situated at the beginning of the feed conduit 13. The conditioning device 23 may be e.g. a cooler which reduces the temperature-dependent water absorption of the granulate. A further conditioning device 24 is situated at the end of the feed conduit 13 to specifically influence the properties of the dispersion or the granulate prior to entry into the dryer 14. Conditioning may thus include a heating of the entire dispersion, for example by means of a heat exchanger, but may also include an energetically more favorable heating action primarily directed to the individual granule in order to facilitate the drying operation.

While the invention has been illustrated and described as embodied in a process for making granulate of polymeric material, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A process for making granulate of polymeric material, comprising the steps of:

plastifying a polymeric material to form a plastic mass;

dividing the plastic mass into single plastic strands;

pressing the plastic strands in a stream of cooling liquid;

shredding the plastic strands in the cooling liquid into granules thereby forming a dispersion;

conveying the dispersion of granules and cooling liquid through a first conduit to a separator;

concentrating the dispersion through increase of the content of granulate in the cooling liquid by withdrawing a portion of cooling liquid;

conveying the concentrated dispersion of granulate and cooling liquid to a dryer along a second conduit which is longer than a length of the first conduit; and separating the cooling liquid from the granulate in the dryer.

2. The process of claim 1 wherein the second conduit is longer by at least one order of a number than the length of the first conduit.

3. The process of claim 1 wherein the separator is a screen pipe.

4. The process of claim 1 wherein the second conduit has a nominal diameter which is smaller than a nominal diameter of the first conduit.

5. The process of claim 1, and further comprising the step of returning the cooling liquid following the separating step into the stream of cooling liquid for realizing the pressing and shredding steps.

6. The process of claim 1, and further comprising the step of returning the withdrawn portion of cooling liquid for re-use as coolant.

7. The process of claim 1, and further comprising the step of pumping the dispersion upstream of said concentrating step.

8. The process of claim 1, and further comprising the step of pumping the dispersion downstream of said concentrating step.

9. The process of claim 1, and further comprising the step of conditioning the concentrated dispersion before said conveying step of the dispersion to the dryer.

10. The process of claim 1, and further comprising the step of conditioning the concentrated dispersion before entry into the dryer.

11. The process of claim 1 wherein the withdrawn portion of cooling liquid represents a manipulated variable, and the content of granulate of the dispersion represents a controlled variable; and further comprising the step of modifying the manipulated variable in dependence on the controlled variable.

12. The process of claim 1 wherein the withdrawn portion of cooling liquid represents a manipulated variable, and a volume flow of granulate of the dispersion represents a controlled variable; and further comprising the step of modifying the manipulated variable in dependence on the controlled variable.

13. The process of claim 1 wherein the withdrawn portion of cooling liquid represents a manipulated variable, and a pressure of granulate of the dispersion represents a controlled variable; and further comprising the step of modifying the manipulated variable in dependence on the controlled variable.

14. The process of claim 1 wherein the transport path of the dispersion between the area of withdrawal of the portion of cooling liquid and the dryer is longer by one order of a number than a transport path of the dispersion between the area of shredding of the single plastic strands and withdrawal of the portion of cooling liquid.

* * * * *